(12) United States Patent
Fujiwara et al.

(10) Patent No.: US 9,028,938 B2
(45) Date of Patent: May 12, 2015

(54) STYRENE RESIN COMPOSITION, AND MOLDED ARTICLE THEREOF

(75) Inventors: Junpei Fujiwara, Isesaki (JP); Masatoshi Kawata, Isesaki (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/877,707

(22) PCT Filed: Oct. 6, 2011

(86) PCT No.: PCT/JP2011/073112
§ 371 (c)(1),
(2), (4) Date: Apr. 4, 2013

(87) PCT Pub. No.: WO2012/046809
PCT Pub. Date: Apr. 12, 2012

(65) Prior Publication Data
US 2013/0209742 A1    Aug. 15, 2013

(30) Foreign Application Priority Data

Oct. 7, 2010  (JP) ................ 2010-227462
Dec. 24, 2010 (JP) ................ 2010-286980

(51) Int. Cl.
| | | |
|---|---|---|
| B65D 85/00 | (2006.01) | |
| C08L 53/00 | (2006.01) | |
| C08L 25/06 | (2006.01) | |
| B65D 73/02 | (2006.01) | |
| C08L 53/02 | (2006.01) | |
| C08J 5/18 | (2006.01) | |

(52) U.S. Cl.
CPC .......... *C08L 25/06* (2013.01); *B65D 73/02* (2013.01); *C08L 53/02* (2013.01); *C08J 5/18* (2013.01)

(58) Field of Classification Search
CPC .......... C08L 25/06; C08L 53/02; C08L 51/04
USPC ........ 428/35.7, 36.4, 36.92; 525/98; 206/701, 206/706, 710, 713, 714, 719
See application file for complete search history.

(56) References Cited

U.S. PATENT DOCUMENTS

| | | | |
|---|---|---|---|
| 4,446,278 A * | 5/1984 | Loucks ............. | 525/92 A |
| 6,933,343 B2 | 8/2005 | Ikematsu et al. | |
| 7,341,793 B2 * | 3/2008 | Ishii et al. ........ | 428/483 |
| 2005/0124739 A1 | 6/2005 | Oda et al. | |
| 2006/0222794 A1 | 10/2006 | Hoshi et al. | |
| 2008/0138597 A1 | 6/2008 | Asai | |
| 2009/0209670 A1 | 8/2009 | Kanae et al. | |
| 2009/0297739 A1 | 12/2009 | Baily et al. | |
| 2009/0311472 A1 * | 12/2009 | McGee et al. ..... | 428/131 |
| 2010/0021765 A1 | 1/2010 | Negandhi et al. | |
| 2011/0008561 A1 | 1/2011 | Kawauchi et al. | |
| 2012/0003429 A1 | 1/2012 | Iwasaki et al. | |
| 2013/0189496 A1 | 7/2013 | Fujiwara et al. | |
| 2013/0209742 A1 | 8/2013 | Fujiwara et al. | |

FOREIGN PATENT DOCUMENTS

| | | |
|---|---|---|
| CN | 1533402 A | 9/2004 |
| CN | 1839075 A | 9/2006 |
| CN | 101115617 A | 1/2008 |
| CN | 101186741 A | 5/2008 |
| CN | 101331179 A | 12/2008 |
| JP | A-9-76424 | 3/1997 |
| JP | A-2002-47387 | 2/2002 |
| JP | A-2002-332392 | 11/2002 |
| JP | A-2003-55526 | 2/2003 |
| JP | A-2003-253069 | 9/2003 |
| JP | A-2003-308733 | 10/2003 |
| JP | A-2003-320605 | 11/2003 |
| JP | A-2005-23268 | 1/2005 |
| JP | A-2005-511808 | 4/2005 |
| JP | A-2006-027266 | 2/2006 |
| JP | A-2006-232914 | 9/2006 |
| JP | A-2007-157440 | 6/2007 |
| JP | A-2010-77294 | 4/2010 |
| JP | A-2010-174166 | 8/2010 |
| WO | WO 03/048227 A1 | 6/2003 |
| WO | WO 2009/081963 A1 | 7/2009 |
| WO | WO 2010/104010 | 9/2010 |

OTHER PUBLICATIONS

International Search Report issued in International Patent Application No. PCT/JP2011/073112 dated Dec. 20, 2011.
Apr. 30, 2014 Chinese Office Action issued in Chinese Application No. 201180048564.7 with partial English-language translation.
U.S. Appl. No. 13/877,750 in the name of Fujiwara et al. filed Apr. 4, 2013.
U.S. Appl. No. 13/877,742 in the name of Fujiwara et al. filed Apr. 4, 2013.
Dec. 20, 2011 International Search Report issued in International Patent Application No. PCT/JP2011/073125.
Apr. 18, 2014 Office Action issued in Chinese Patent Application No. 201180048 (with partial translation).
Dec. 20, 2011 International Search Report issued in International Patent Application No. PCT/JP2011/073105.
May 21, 2014 Search Report issued in Chinese Patent Application No. 2011800485789 (with translation).
Jan. 4, 2015 Office Action issued in Chinese Applicaiton No. 2011800485647 (with partial translation).
Dec. 4, 2014 Office Action issued in Chinese Application No. 201180048577.4, partial translation.
Feb. 26, 2015 Office Action issued in U.S. Appl. No. 13/877,742.

\* cited by examiner

*Primary Examiner* — Walter B Aughenbaugh
(74) *Attorney, Agent, or Firm* — Oliff PLC

(57) ABSTRACT

An electronic component packaging sheet formed of a styrene resin composition includes: (A) 29-65 mass parts of a styrene-conjugated diene block copolymer; (B) 51-15 mass parts of a polystyrene resin; and (C) 20-9 mass parts of an impact resistant polystyrene resin. Components (A)-(C) each have a weight average molecular weight (Mw) within a specified range.

5 Claims, 1 Drawing Sheet

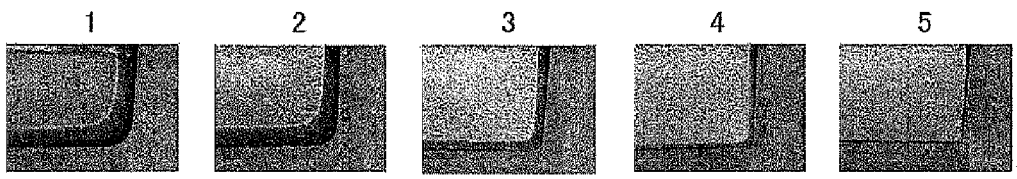
Evaluation Criteria Samples

STYRENE RESIN COMPOSITION, AND MOLDED ARTICLE THEREOF

TECHNICAL FIELD

The present invention relates to a sheet for packaging electronic components comprising a styrene resin composition suitable for use in a container for packaging electronic components such as connectors and capacitors.

BACKGROUND ART

Embossed carrier tapes for mounting electronic components such as IC's and LSI's to electronic devices usually consist of sheets of a thermoplastic resin such as a vinyl chloride resin, a styrene resin or a polycarbonate resin, embossed by thermoforming. Such embossed carrier tapes are often formed of opaque sheets that have been rendered conductive, for example, by adding a conductive filler such as carbon black to a thermoplastic resin, as a countermeasure taken to prevent electrostatic damage to the electronic components. On the other hand, embossed carrier tapes for housing electronic components that are less susceptible to electrostatic damage such as, for example, capacitors, may be of transparent type using thermoplastic resins of relatively high transparency in order to enable the electronic components contained therein to be observed from outside or to detect writing on the components.

As sheets for use in transparent type embossed carrier tapes, sheets mixing general-purpose polystyrene resins with styrene-conjugated diene block copolymers (see Patent Documents 1 and 2) and sheets using MBS resins (Patent Document 3) have been proposed.

Since the carrier tapes using these sheets are transparent, they enable electronic components contained inside to be viewed from outside, and enable text or the like printed on the components to be sensed, and therefore have come under increased application in recent years.

RELATED ART

Patent Documents

Patent Document 1: JP 2003-055526 A
Patent Document 2: JP 2002-332392 A
Patent Document 3: JP 2003-253069 A

SUMMARY OF THE INVENTION

However, when these sheets are thermoformed into carrier tapes or the like, if pockets with relatively large draw ratios are to be formed, then they will become very thin at the cavities, making it difficult to obtain cavities of sufficient strength, and the forming may make the sheets less transparent than they were before forming.

The present invention addresses the problem of providing a styrene resin sheet for use in electronic component packaging such as embossed carrier tape, the sheet enabling pockets of large draw ratio (pocket depth) with excellent transparency and strength to be formed by thermoforming. The present invention further addresses the problem of providing a carrier tape or the like having pockets formed by thermoforming such sheets, enabling writing on the electronic components contained therein to be observed from outside the pockets.

The present inventors discovered that the aforementioned problems can be solved by thermoforming a sheet comprising three types of styrene resins of different molecular structure, having specific weight-average molecular weights respectively, thereby achieving the present invention.

In other words, the present invention is a sheet for use in electronic component packaging, comprising (A) 29 to 65 parts by mass of a styrene-conjugated diene block copolymer; (B) 51 to 15 parts by mass of a polystyrene resin; and (C) 20 to 9 parts by mass of a high-impact polystyrene resin; wherein the components (A) to (C) have weight-average molecular weights (Mw) in the following ranges:
component (A): Mw=80,000 to 220,000;
component (B): Mw=200,000 to 400,000;
component (C): Mw=150,000 to 210,000.

The resin composition used in the sheet of the present invention should preferably having a melt tension at 220° C. of 10 to 30 mN. Additionally, the proportion of the conjugated diene blocks in 100 parts by mass of component (A) should preferable be 10 to 25 mass %. Furthermore, the peak molecular weight of the styrene blocks of component (A) as measured by GPC should preferably be in the range of 30,000 to 120,000, and the half-width of the molecular weight distribution curve of the styrene blocks should be in the range of 0.8 to 1.25. Finally, the particle size of the graft rubber in component (C) should preferably be 2.2 to 3.0 μm, and the proportion of rubber in the graft rubber of the substrate should preferably be 0.75 to 1.90 mass %.

On the other hand, the present invention also includes an embossed carrier tape using the aforementioned sheet.

According to the present invention, a styrene resin sheet that can be used for electronic component packaging such as embossed carrier tape enabling pockets of large draw ratio (pocket depth) with excellent transparency and strength to be formed by thermoforming is obtained, and the sheet can be thermoformed to obtain a carrier tape enabling writing on electronic components contained therein to be observed from outside the pockets.

BRIEF DESCRIPTION OF THE DRAWINGS

FIG. 1 shows photographs of the criteria (1-5) for evaluating the formativeness of pockets thermoformed from the sheets of the present invention.

MODES FOR CARRYING OUT THE INVENTION

The present invention shall be explained in detail below.

As mentioned above, the present invention relates to a sheet comprising a resin composition including (A) a styrene-conjugated diene block copolymer, (B) a polystyrene resin, and (C) a high-impact polystyrene resin, respectively having specific weight-average molecular weights.

The (A) styrene-conjugated diene block copolymer is a polymer including, in its structure, polymer blocks mainly composed of styrene monomers and polymer blocks mainly composed of conjugated diene monomers. Examples of styrenic monomers include styrene, o-methylstyrene, p-methylstyrene, p-tert-butylstyrene, 1,3-dimethylstyrene, alpha-methylstyrene, vinylnapththalene, vinylanthracene and 1,1-diphenylethylene. While the present invention mainly uses styrene, one or more other of the above components may be included as trace components.

Conjugated diene monomers are compounds having conjugated double bonds in their structure. Examples include 1,3-butadiene (butadiene), 2-methyl-1,3-butadiene (isoprene), 2,3-dimethyl-1,3-butadiene, 1,3-pentadiene, 1,3-hexadiene and 2-methylpentadiene, among which butadiene and isoprene are preferred. One or more types of conjugated diene monomers may be used. The polymer blocks consisting mainly of styrene monomers refer to both polymer blocks consisting of only structures derived from styrene monomers and polymer blocks comprising structures derived from styrene monomers in an amount of at least 50 mass %. The polymer blocks consisting mainly of conjugated diene monomers refer to both polymer blocks consisting of only structures derived from conjugated diene monomers and polymer blocks comprising structures derived from conjugated diene monomers in an amount of at least 50 mass %. The conjugated diene content in the (A) styrene-conjugated diene block copolymer, for every 100 parts by mass of component (A), should preferably be 10 to 25 mass %, 20 to 24 mass %, 20 to 22 mass % or 22 to 24 mass % in view of the mechanical properties of the sheet.

The conjugated diene content refers to the proportion by mass of structures derived from conjugated diene monomers with respect to the entire copolymer. One or more types of styrene-conjugated diene block copolymers may be used. In the present invention, if for example the conjugated diene is butadiene, the styrene-conjugated diene block copolymer may be either a styrene-butadiene (SB) diblock copolymer or a styrene-butadiene-styrene (SBS) triblock copolymer, or may be a resin composed of three or more styrene blocks and two or more butadiene blocks. Furthermore, the copolymer may have a so-called tapered block structure wherein the component ratio between the styrenes and butadienes in the blocks continuously change. Additionally, the styrene-conjugated diene block copolymers may be those that are available on the market used as they are.

The (A) styrene-conjugated diene block copolymer used in the present invention, as explained below, has a styrene-converted weight-average molecular weight (Mw) in the range of 80,000 to 220,000. The peak molecular weight of the styrene blocks in component (A) as measured by GPC is preferably in the range of 30,000 to 120,000, more preferably 40,000 to 110,000, or 40,000 to 90,000, or 80,000 to 110,000. Additionally, the molecular weight distribution curve of the styrene blocks in component (A) preferably has a half-width in the range of 0.8 to 1.25, more preferably 1.05 to 1.25, or 0.9 to 1.15, or 1.05 to 1.20. This range ensures that good formability is obtained. The molecular weight distribution curve of the styrene blocks in component (A) can be determined by the following method. First, component (A) is subjected to oxidative degradation by chloroform using osmium tetroxide as a catalyst, in accordance with the method described in I. M. Kolthoff, et al., *J. Polym. Sci.*, I, 429 (1946), then the resulting styrene blocks are dissolved in a tetrahydrofuran solvent and measured by GPC. The molecular weight curve can then be used to determine the styrene-converted peak molecular weight using standard polystyrene (monodisperse). The GPC measurements may be in accordance with conventional techniques, with the main measurement conditions being as follows:

Column temperature: 40° C.
Detection method: differential refractometry
Mobile phase: tetrahydrofuran
Sample concentration: 2 mass %
Calibration curve: from standard polystyrene (monodisperse)

The half-width can be determined using this molecular weight distribution curve for the styrene blocks. Specifically, when the molecular weight is placed on the horizontal axis using a logarithmic scale with the range of 1000 to 1,000,000 being 15 cm, and the concentration (weight ratio) is placed on the vertical axis at an arbitrary height, the width of the peak on the horizontal axis at a height of 50% of the peak top is the half-width. In this case, the height of the peak top must be that perpendicular to the horizontal axis, and the width of the peak at 50% of the height must be parallel to the horizontal axis. The half-width of the molecular weight distribution curve of the styrene blocks correlates with the molecular weight distribution of the block copolymer. While the method of adjusting the molecular weight distribution is not particularly restricted, when polymerizing the styrene block portions of component (A), block copolymers of different molecular weights can be obtained by methods such as adjusting the time of addition of the initiator.

The (B) polystyrene resin is a resin generally known as a GPPS, mainly composed of styrene monomers, but may contain one or more aromatic vinyl compounds such as o-methylstyrene, p-methylstyrene, p-tert-butylstyrene, 1,3-dimethylstyrene, alpha-methylstyrene, vinylnaphthalene, vinylanthracene and 1,1-diphenylethylene as a trace component, and a commercially available resin may be used.

The (C) high impact polystyrene resin in the present invention is a resin generally known as a HIPS, and is a polystyrene resin comprising microparticulate graft rubber to which styrene monomers have been grafted. Examples of the rubber components in the graft rubber include, for example, diene rubbers with 1,3-butadiene (butadiene), 2-methyl-1,3-butadiene (isoprene), 2,3-dimethyl-1,3-butadiene, 1,3-pentadiene, 1,3-hexadiene and 2-methylpentadiene as monomers. Additionally, a thermoplastic elastomer which is a styrene-conjugated diene block copolymer wherein the conjugated diene component takes up at least 50 mass % may be used. Among these, polybutadiene and styrene-butadiene block copolymers are preferred.

With the graft rubber in component (C), having a particle size in the range of at least 2.0 μm and at most 3.0 μm, preferably at least 2.0 μm and at most 2.5 μm, or at least 2.3 μm and at most 2.7 μm, the substrate sheet excels in transparency and strength properties. The graft rubber particle size here refers to the average particle size of the graft rubber component measured by a laser diffraction type particle analyzer. Additionally, in the sheet of the present invention, the graft rubber content derived from component (C) in the sheet when the sheet is defined as 100 mass % should be 0.75 to 1.90 mass %, 0.70 to 1.75 mass %, 0.71 to 1.72 mass %, 0.75 to 1.60 mass % or 0.77 to 1.58 mass % in order to achieve balance between impact resistance and transparency of the sheet. The graft rubber content in component (C) and the proportional content of component (C) in the sheet should preferably be adjusted to put the graft rubber content of the sheet in the above-indicated ranges. The graft rubber content of component (C) can be calculated by dissolving in a mixed solvent of MEK and acetone at a 50/50 mass ratio, recovering the undissolved part in a centrifuge, and finding the mass thereof.

The sheet of the present invention comprises a resin composition containing 29 to 65 parts by mass, preferably 35 to 60 parts by mass, 35 to 58 parts by mass, or 40 to 55 parts by mass of component (A), 51 to 15 parts by mass, preferably 45 to 20 parts by mass, or 51 to 25 parts by mass of component (B), and 20 to 9 parts by mass of component (C), with (A) to (C) totaling 100 parts by mass. By setting the composition in these ranges, a sheet that is satisfactory in strength properties, impact resistance and transparency can be obtained.

The weight-average molecular weight (Mw) of each component (A) to (C) can be determined from a standard polystyrene-converted molecular weight distribution curve determined by conventional methods using GPC. As the weight-average molecular weight of the components (A) to (C) of the present invention, resins in the following ranges are used:

Component (A): Mw=80,000 to 220,000; preferably 140,000 to 200,000; or 150,000 to 200,000; or 140,000 to 150,000.
Component (B): Mw=200,000 to 400,000; preferably 290,000 to 390,000; or 290,000 to 330,000; or 330,000 to 390,000.
Component (C): Mw=150,000 to 210,000; preferably 180,000 to 190,000.

By using resins in such ranges of weight-average molecular weight, not only does it become possible to adjust the appropriate range of melt tension for this resin composition as described below, but also a sheet with a good balance of strength properties and transparency can be obtained, with very good formability when thermoforming the resulting sheets into carrier tape or the like, enabling good pocket formation even for deep draw forming. For the purposes of the present invention, good formability means that when forming pockets, the thickness of the pocket side surfaces is enough to achieve good buckling strength for the pockets while simultaneously having good formativeness of the corner portions of the bottom surface of the pockets, so that the mold shape can be faithfully transferred.

If the Mw of components (A) and (B) exceeds the above ranges, then the melt tension can become too high, making the thickness of the pocket side surfaces too thin when press-forming, so that sufficient buckling strength cannot be obtained for the pockets. In the event of compressed-air forming, the formativeness of the corner portions of the bottom surface of the pockets is poor, and the stability when loading electronic components such as IC's is poor. On the other hand, if the Mw of components (A) and (B) is lower than the above range, then good formability can be obtained for shallow draw press forming, but the side surfaces will become too thick and result in inadequate transparency. Furthermore, deep draw forming of more than a certain level will cause the melt tension to be inadequate, resulting in the formation of holes and preventing products from being formed.

The melt tension in the present invention is the melt tension measured using a melt tension measuring device with an orifice diameter of 1.0 mm$\phi$, an orifice length of 10 mm, and windup speeds of 10, 30 and 50 m/minute. The melt tension at 220° C. of the resin composition comprising components (A) to (C) according to the present invention should preferably be 10 to 30 mN, 13 to 32 mN, 14 to 31 mN, 15 to 29 mN, 16 to 28 mN, 17 to 27 mN, 18 to 26 mN, 19 to 25 mN, 20 to 24 mN, 21 to 23 mN, or 22 to 23 mN. At these ranges, sheets with particularly good formability when thermoforming the sheets into containers can be obtained. When the melt tension is less than 10 mN, holes may form when thermoforming the sheet, and when exceeding 30 mN, the formativeness (sharpness) of the pockets of the formed articles may be deficient. This melt tension can be adjusted within the range of 10 mN to 30 mN by adjusting the weight-average molecular weights of the components (A) to (C) and the proportional content of the components.

The method of producing the sheet of the present invention using the resin composition comprising the above components (A) to (C) is not particularly limited and the sheet may be produced by a common method. For example, the components (A) to (C) can be blended in a predetermined ratio and mixed using a commonly used mixer such as a tumbler, then kneaded in an extruder to form pellet-shaped compounds. These pellet-shaped compounds can then be extruded using a $\phi$65 mm extruder with a T-die to produce sheets. Additionally, so-called "ear" portions formed during the sheet extrusion process can be pulverized and returned to the substrate layer within a range not greatly affecting the strength of the sheet and the molded article after forming.

By using publicly known sheet formation methods (thermoforming) such as vacuum forming, compressed-air forming and press-forming, the sheets of the present invention can be used to obtain electronic component packaging containers of free shapes such as carrier tape (embossed carrier tape) and trays. By using the sheets of the present invention, deep draw forming of the container depth of the packaging containers is possible, and packaging containers of excellent strength can be obtained.

In particular, it is extremely effective in the embossment of carrier tapes. Embossed carrier tapes are used by placing electronic components in receptacle portions formed by the aforementioned forming methods, then covering with carrier tape and winding into reels to obtain carrier tape bodies which can be used to store and transport electronic components.

Carrier tape bodies consist of carrier tape housing electronic components. There are no particular limitations on the type of electronic component to be packaged, but examples include IC's, LED's (light-emitting diodes), resistors and capacitors. Additionally, they can be used to package intermediate products or final products using such electronic components.

EXAMPLES

Methods of Evaluation of Sheets and Formed Articles

Molded articles produced by forming sheets in accordance with the respective examples/comparative examples and embossing were evaluated in accordance with the below-indicated evaluation methods.
(1) Evaluation of Properties of Raw Material Resin
(1-1) Molecular Weight Measurement The molecular weight of each resin raw material (A) to (C) used in the present invention was determined as a standard polystyrene-converted weight-average molecular weight (Mw) by a conventional technique using GPC (gel permeation chromatography). The GPC measurements were made under the following conditions:
Column temperature: 40° C.
Method of detection: differential refractometry
Mobile phase: tetrahydrofuran
Sample concentration: 2 mass %
Calibration curve: standard polystyrene (Polymer Laboratories)
(1-2) Evaluation of Peak Molecular Weight and Molecular Weight Distribution Peak Width of Styrene Blocks of (A) Styrene-Conjugated Diene Block Copolymer The (A) component resin and sheets used in the examples and comparative examples were measured for block styrene content after oxidative degradation by tertiary butyl hydroperoxide using osmium tetroxide as a catalyst (I. M. Kolthoff, et al., *J. Polym. Sci.*, I, 429 (1946)).

The resulting styrene blocks of component (A) were dissolved in a tetrahydrofuran solvent, and chromatocharts of the molecular weight distribution were obtained by a conventional technique using gel permeation chromatography (GPC). The peak molecular weight was determined by performing GPC measurements of the GPC standard polystyrene (monodisperse), and reading the peak molecular weight from the measured chromatochart based on the calibration curve for the number-average molecular weight of the standard polystyrene and the peak count.

The molecular weight distribution chart from which the above peak molecular weight was determined was arranged with the molecular weight shown on the horizontal axis with a logarithmic scale, with the range of 1000 to 1,000,000 being 15 cm, and the width of the peak (in units of cm) on the horizontal axis was determined at 50% of the height of the peak top.

(2) Sheet Formability Evaluation

Using sheets according to the respective examples and comparative examples, pockets of depth 9 mm and 18 mm were formed in press forming apparatus and compressed-air forming apparatus, and the formativeness thereof was evaluated by the "sharpness" of the molded article. Additionally, the press-forming was evaluated by whether or not holes were opened in the pockets during forming, and for those without holes, the thickness of the side surface of the pockets.

(Forming Conditions)

Press forming: heater temperature 190° C.
Compressed-air forming: heater temperature 220° C.

(Formativeness Evaluation Criteria)

The pocket angles of the molded articles were observed, and the "sharpness" was graded in five levels by visual observation in accordance with the samples 1-5 shown in FIG. 1.

(3) Molded Article Transparency Evaluation

The bottom surfaces and side surfaces of pockets of the molded articles obtained by molding in the press forming apparatus were all cut out, held between black plates with holes of φ6 mm (28.26 mm$^2$), and the haze values of the bottom surfaces and side surfaces were measured by a haze meter in accordance with JIS K 7105.

(4) Molded Article Buckle Strength Evaluation

A strograph (Toyo Seiki) was used to measure, as the buckle strength, the strength needed to compress the pocket bottom portion to 4 mm (pocket depth 9 mm) and 8 mm (pocket depth 18 mm) when placing a molded article obtained by forming with a press forming apparatus with the pocket mouth portion down. The buckle strength is considered to be sufficient to withstand actual use as a container with a value of at least 35 N in a molded article of depth 9 mm and at least 30 N in a molded article of pocket depth 18 mm.

Resins Used in Examples and Comparative Examples

The properties of the resin components (A) to (C) used in the examples and comparative examples of the present invention are shown in Table 1.

Example 1

58 parts by mass of a styrene-butadiene block copolymer (Mw: 150,000; conjugated diene content 20 mass %) (A-1), 33 parts by mass of a polystyrene resin (Mw: 330,000) (B-1) and 9 parts by mass of a high impact polystyrene resin (Mw: 180,000; graft rubber particle size 2.5 (C-1) were dry-blended, and formed into a film using a φ40 mm extruder (L/D=26) and a T-die of width 600 mm, to form a sheet of thickness 500 μm.

The rubber part of the graft rubber in the resulting sheet was 0.77 mass % (calculated value) with respect to 100 mass % of the resin composition. The results of evaluation tests of this sheet are shown in Table 2, Table 3 and Table 4.

Examples 2-14, Comparative Examples 1-12

Sheets were obtained in the same manner as Example 1 aside from using resins chosen from A-1 to A-5, B-1 to B-5 and C-1 to C-3 shown in Table 1 as the resin components (A) to (C), and blending them in the mass ratios shown in Table 2.

Evaluation results for molded articles of pocket depth 9 mm and 18 mm for the respective examples are shown in Table 3 and Table 4 respectively.

TABLE 1

|  |  | Weight Average Molecular Weight | Conjugated Diene Content (Mass %) | Styrene Block Peak Molecular Weight | Styrene Block Peak Half-width (cm) |
|---|---|---|---|---|---|
| Styrene-Butadiene Copolymer (A) | A-1 | 150,000 | 20 | 40,000 | 1.11 |
|  | A-2 | 140,000 | 24 | 109,000 | 0.94 |
|  | A-3 | 200,000 | 22 | 85,000 | 1.07 |
|  | A-4 | 240,000 | 12 | 130,000 | 0.80 |
|  | A-5 | 70,000 | 40 | 15,000 | 1.30 |

|  |  | Weight Average Molecular Weight |
|---|---|---|
| Polystyrene (B) | B-1 | 330,000 |
|  | B-2 | 290,000 |
|  | B-3 | 390,000 |
|  | B-4 | 470,000 |
|  | B-5 | 120,000 |

|  |  | Weight Average Molecular Weight | Graft Rubber Particle Size (μm) | Graft Rubber Content (mass %) |
|---|---|---|---|---|
| High-Impact Polystyrene (C) | C-1 | 180,000 | 2.5 | 8.6 |
|  | C-2 | 190,000 | 2.0 | 7.9 |
|  | C-3 | 100,000 | 1.8 | 6.1 |

TABLE 2

|  | Styrene-Conjugated Diene Block Copolymer (A) | | | | | Polystyrene (B) | | | | | High Impact Polystyrene (C) | | | Graft Rbbr Content (mass %) | Melt Tensn (10 m/min) (mN) | Melt Tensn (30 m/min) (mM) | Melt Tensn (50 m/min) (mN) |
|---|---|---|---|---|---|---|---|---|---|---|---|---|---|---|---|---|---|
|  | A1 | A2 | A3 | A4 | A5 | B1 | B2 | B3 | B4 | B5 | C1 | C2 | C3 |  |  |  |  |
| Example 1 | 58 |  |  |  |  | 33 |  |  |  |  | 9 |  |  | 0.77 | 18 | 20 | 21 |
| Example 2 |  | 58 |  |  |  | 33 |  |  |  |  |  | 9 |  | 0.71 | 18 | 20 | 21 |
| Example 3 | 58 |  |  |  |  |  | 33 |  |  |  | 9 |  |  | 0.77 | 16 | 19 | 20 |
| Example 4 | 40 |  |  |  |  | 51 |  |  |  |  | 9 |  |  | 0.77 | 26 | 30 | 31 |
| Example 5 |  | 40 |  |  |  |  | 51 |  |  |  |  | 9 |  | 0.71 | 23 | 27 | 28 |
| Example 6 |  | 58 |  |  |  | 33 |  |  |  |  | 9 |  |  | 0.77 | 17 | 19 | 20 |
| Example 7 | 55 |  |  |  |  | 25 |  |  |  |  | 20 |  |  | 1.72 | 16 | 18 | 19 |
| Example 8 |  | 55 |  |  |  | 25 |  |  |  |  |  | 20 |  | 1.58 | 15 | 17 | 18 |
| Example 9 | 55 |  |  |  |  |  | 25 |  |  |  | 20 |  |  | 1.72 | 14 | 17 | 18 |
| Example 10 | 35 |  |  |  |  | 45 |  |  |  |  | 20 |  |  | 1.72 | 22 | 26 | 27 |
| Example 11 |  | 35 |  |  |  |  | 45 |  |  |  |  | 20 |  | 1.58 | 20 | 23 | 24 |
| Example 12 |  | 55 |  |  |  | 25 |  |  |  |  |  | 20 |  | 1.58 | 15 | 17 | 18 |
| Example 13 |  |  | 58 |  |  |  | 33 |  |  |  | 9 |  |  | 0.71 | 29 | 31 | 32 |

TABLE 2-continued

| | Styrene-Conjugated Diene Block Copolymer (A) | | | | | Polystyrene (B) | | | | | High Impact Polystyrene (C) | | | Graft Rbbr Content (mass %) | Melt Tensn (10 m/min) (mN) | Melt Tensn (30 m/min) (mM) | Melt Tensn (50 m/min) (mN) |
|---|---|---|---|---|---|---|---|---|---|---|---|---|---|---|---|---|---|
| | A1 | A2 | A3 | A4 | A5 | B1 | B2 | B3 | B4 | B5 | C1 | C2 | C3 | | | | |
| Example 14 | 65 | | | | | 15 | | | | | 20 | | | 1.72 | 13 | 15 | 17 |
| Comp. Example 1 | | | 58 | | | | | 33 | | | | | 9 | 0.55 | 31 | 33 | 34 |
| Comp. Example 2 | | | 40 | | | | | 51 | | | | | 9 | 0.55 | 33 | 35 | 36 |
| Comp. Example 3 | | | | | 40 | | | | | 51 | | | 9 | 0.55 | 8 | 9 | 9 |
| Comp. Example 4 | | | | | 58 | | | 33 | | | | | 9 | 0.55 | 7 | 8 | 8 |
| Comp. Example 5 | | | 55 | | | | | 25 | | | | | 20 | 1.22 | 30 | 32 | 33 |
| Comp. Example 6 | | | 35 | | | | | 45 | | | | | 20 | 1.22 | 31 | 33 | 34 |
| Comp. Example 7 | | | | 35 | | | | | 45 | | | | 20 | 1.22 | 9 | 10 | 10 |
| Comp. Example 8 | | | | 55 | | | | | 25 | | | | 20 | 1.22 | 8 | 9 | 10 |
| Comp. Example 9 | 80 | | | | | 11 | | | | | 9 | | | 0.71 | 15 | 17 | 17 |
| Comp. Example 10 | 30 | | | | | 61 | | | | | 9 | | | 0.71 | 31 | 34 | 35 |
| Comp. Example 11 | | 50 | | | | | 20 | | | | | 30 | | 2.37 | 16 | 18 | 20 |
| Comp. Example 12 | 75 | | | | | 20 | | | | | 5 | | | 0.43 | 14 | 16 | 17 |

TABLE 3

| | Press Forming | | | | | | Comp Air |
|---|---|---|---|---|---|---|---|
| | Formative ness | Holes | Side Thickness (μm) | Haze (Bottom) (%) | Haze (Side) (%) | Buckle Strength (N) | Forming Formative- ness |
| Example 1 | 5 | none | 225 | 15 | 12 | 60 | 5 |
| Example 2 | 5 | none | 225 | 14 | 12 | 60 | 5 |
| Example 3 | 5 | none | 253 | 13 | 12 | 68 | 5 |
| Example 4 | 5 | none | 171 | 12 | 11 | 46 | 5 |
| Example 5 | 5 | none | 191 | 12 | 11 | 51 | 5 |
| Example 6 | 5 | none | 238 | 12 | 12 | 64 | 5 |
| Example 7 | 5 | none | 247 | 17 | 14 | 66 | 5 |
| Example 8 | 5 | none | 266 | 16 | 14 | 71 | 5 |
| Example 9 | 5 | none | 272 | 15 | 15 | 74 | 5 |
| Example 10 | 5 | none | 184 | 14 | 13 | 49 | 5 |
| Example 11 | 5 | none | 203 | 14 | 13 | 54 | 5 |
| Example 12 | 5 | none | 270 | 14 | 15 | 72 | 5 |
| Example 13 | 5 | none | 150 | 13 | 11 | 40 | 5 |
| Example 14 | 5 | none | 285 | 14 | 15 | 38 | 5 |
| Comp. Example 1 | 5 | none | 128 | 15 | 10 | 33 | 2 |
| Comp. Example 2 | 5 | none | 123 | 15 | 10 | 32 | 1 |
| Comp. Example 3 | 5 | none | 331 | 15 | 25 | 88 | 5 |
| Comp. Example 4 | 5 | none | 335 | 15 | 25 | 89 | 5 |
| Comp. Example 5 | 5 | none | 128 | 17 | 13 | 33 | 2 |
| Comp. Example 6 | 5 | none | 127 | 17 | 13 | 33 | 1 |
| Comp, Example 7 | 5 | none | 326 | 17 | 27 | 87 | 5 |
| Comp. Example 8 | 5 | none | 330 | 17 | 28 | 88 | 5 |
| Comp. Example 9 | 5 | none | 265 | 17 | 13 | 33 | 5 |
| Comp. Example 10 | 5 | none | 127 | 16 | 10 | 27 | 5 |
| Comp. Example 11 | 5 | none | 255 | 27 | 28 | 50 | 5 |
| Comp. Example 12 | 5 | none | 279 | 11 | 11 | 32 | 5 |

TABLE 4

| | Press Forming | | | | | | Comp Air |
|---|---|---|---|---|---|---|---|
| | Formative ness | Holes | Side Thickness (μm) | Haze (Bottom) (%) | Haze (Side) (%) | Buckle Strength (N) | Forming Formative- ness |
| Example 1 | 5 | none | 150 | 15 | 11 | 40 | 5 |
| Example 2 | 5 | none | 150 | 14 | 11 | 40 | 5 |
| Example 3 | 5 | none | 169 | 13 | 11 | 45 | 5 |
| Example 4 | 5 | none | 120 | 12 | 10 | 36 | 5 |
| Example 5 | 5 | none | 117 | 12 | 10 | 35 | 5 |
| Example 6 | 5 | none | 159 | 12 | 11 | 42 | 5 |
| Example 7 | 5 | none | 169 | 17 | 14 | 45 | 5 |
| Example 8 | 5 | none | 180 | 16 | 14 | 48 | 5 |
| Example 9 | 5 | none | 193 | 15 | 15 | 51 | 5 |

TABLE 4-continued

|  | Press Forming | | | | | Comp Air |
|---|---|---|---|---|---|---|
|  | Formative ness | Holes | Side Thickness (μm) | Haze (Bottom) (%) | Haze (Side) (%) | Buckle Strength (N) | Forming Formativeness |
| Example 10 | 5 | none | 123 | 14 | 14 | 33 | 5 |
| Example 11 | 5 | none | 135 | 14 | 13 | 36 | 5 |
| Example 12 | 5 | none | 180 | 14 | 14 | 48 | 5 |
| Example 13 | 5 | none | 105 | 14 | 10 | 33 | 4 |
| Example 14 | 5 | none | 208 | 16 | 14 | 37 | 5 |
| Comp. Example 1 | 5 | none | 95 | 15 | 9 | 25 | 2 |
| Comp. Example 2 | 5 | none | 90 | 15 | 9 | 24 | 1 |
| Comp. Example 3 | 1 | yes | — | — | — | — | 5 |
| Comp. Example 4 | 1 | yes | — | — | — | — | 5 |
| Comp. Example 5 | 5 | none | 98 | 17 | 12 | 26 | 2 |
| Comp. Example 6 | 5 | none | 94 | 17 | 12 | 25 | 2 |
| Comp. Example 7 | 1 | yes | — | — | — | — | 5 |
| Comp. Example 8 | 1 | yes | — | — | — | — | 5 |
| Comp. Example 9 | 4 | none | 180 | 15 | 11 | 28 | 5 |
| Comp. Example 10 | 4 | none | 96 | 14 | 9 | 24 | 4 |
| Comp. Example 11 | 5 | none | 168 | 23 | 19 | 31 | 5 |
| Comp. Example 12 | 4 | none | 199 | 9 | 9 | 21 | 5 |

* The "—" symbol in the table indicates that no evaluation was made due to the presence of holes.

The invention claimed is:

1. A sheet for use in electronic component packaging, comprising (A) 29 to 65 parts by mass of a styrene-conjugated diene block copolymer comprising at least one styrene block and at least one conjugated diene block; (B) 51 to 15 parts by mass of a polystyrene resin; and (C) 20 to 9 parts by mass of a high-impact polystyrene resin comprising graft rubber particles; wherein the components (A) to (C) have weight-average molecular weights (Mw) in the following ranges:
   component (A): Mw=140,000 to 220,000;
   component (B): Mw=200,000 to 400,000;
   component (C): Mw=150,000 to 190,000,
   wherein the average particle size of the graft rubber particles in component (C) is 2.0 to 3.0 μm, and the proportion of the graft rubber particles in the sheet is 0.75 to 1.90 mass %, the sheet being 100 mass %.

2. The sheet for use in electronic component packaging according to claim 1, having a melt tension at 200° C. of 10 to 30 mN.

3. The sheet for use in electronic component packaging according to claim 1, wherein the proportion of the at least one conjugated diene block in 100 mass % of component (A) is 10 to 25 mass %.

4. The sheet for use in electronic component packaging according to claim 1, wherein the peak molecular weight of the at least one styrene block of component (A) as measured by GPC is in the range of 30,000 to 120,000, and the half-width of the molecular weight distribution curve of the at least one styrene block is in the range of 0.8 to 1.25.

5. An embossed carrier tape comprised of the sheet according to claim 1.

* * * * *